(12) United States Patent
Hakushima et al.

(10) Patent No.: US 11,588,346 B2
(45) Date of Patent: Feb. 21, 2023

(54) POWER SUPPLY CONTROL DEVICE AND POWER SUPPLY CONTROL METHOD

(71) Applicant: DENSO TEN Limited, Kobe (JP)

(72) Inventors: Daiki Hakushima, Kobe (JP); Takeshi Matsumoto, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 17/479,134

(22) Filed: Sep. 20, 2021

(65) Prior Publication Data

US 2022/0368153 A1 Nov. 17, 2022

(30) Foreign Application Priority Data

May 17, 2021 (JP) .............................. JP2021-083162

(51) Int. Cl.
*H02J 9/06* (2006.01)
*H02J 7/00* (2006.01)
*B60R 16/033* (2006.01)

(52) U.S. Cl.
CPC ............ *H02J 9/061* (2013.01); *H02J 7/0031* (2013.01); *B60R 16/033* (2013.01)

(58) Field of Classification Search
CPC ......... H02J 7/0031; H02J 9/061; B60R 16/03; B60R 16/033

USPC .......................................................... 307/20
See application file for complete search history.

(56) References Cited

U.S. PATENT DOCUMENTS

2020/0216002 A1\* 7/2020 Mazaki ................. H02H 3/08

FOREIGN PATENT DOCUMENTS

JP 2019-062727 A 4/2019

\* cited by examiner

*Primary Examiner* — Hal Kaplan
(74) *Attorney, Agent, or Firm* — Oliff PLC (57) ABSTRACT

A power supply control device includes a first system, a second system, an inter-system switch, a battery switch and a controller. The controller turns off an inter-system switch that connects and disconnects the systems and turns on a battery switch that connects and disconnects a second power supply to and from the second system in response to an abnormality of a first power supply or the second power supply being detected and thereafter turn on the inter-system switch and turns off the battery switch in response to determination that there is no abnormality in the power supplies. Before turning on the inter-system switch, when voltage difference between the power supplies is equal to or larger than a threshold, the controller performs convergence control, and after determining that there is no abnormality in the power supplies, the controller keeps the battery switch turned off while performing the convergence control.

11 Claims, 9 Drawing Sheets

POWER SUPPLY CONTROL DEVICE AND POWER SUPPLY CONTROL METHOD

CROSS-REFERENCE TO RELATED APPLICATIONS

This application is based on and claims priorities under 35 USC 119 from Japanese Patent Application No. 2021-083162 filed on May 17, 2021, the content of which is incorporated herein by reference.

TECHNICAL FIELD

Embodiments of this disclosure relate to a power supply control device and a power supply control method.

BACKGROUND ART

In the related art, there is a redundant power supply system which has a first power supply and a second power supply so as to supply power to on-board equipment (loads) for automatic drive by one of power supply systems if a ground fault occurs in the other power supply system, such that even if a power supply fault occurs when the vehicle runs by automatic drive, the redundant power supply system enables the vehicle to perform evacuation travel to a safe place and to stop there.

The redundant power supply system has a first system for supplying power of a first power supply to a first load for automatic drive, and a second system for supplying power of a second power supply to a second load having the same function as the first load has.

Further, the redundant power supply system has an inter-system switch capable of connecting and disconnecting the first system and the second system to and from each other, and a battery switch capable of connecting and disconnecting the second power supply and the second system to and from each other.

The redundant power supply system normally keeps the inter-system switch and the battery switch in a conductive state to supply power from the first power supply to the first load and the second load, and, for example, if the voltage of the first power supply or the second power supply becomes equal to or lower than a ground fault threshold, the redundant power supply system determines a ground fault, and turns off the inter-system switch. Therefore, if a ground fault occurs in one power supply system, the redundant power supply system supplies power to the load for automatic drive by the other power supply system, thereby capable of performing backup control for running for evacuation.

In the redundant power supply system, for example, when the first load or the second load is in an overload state, even though any ground fault has not occurred, the voltages of the first power supply and the second power supply may become equal to or lower than the ground fault threshold temporally. In this case, if the redundant power supply system misjudges the occurrence of the overload state as a ground fault and turns off the inter-system switch unnecessarily, the vehicle stops automatic drive which can be normally continued, and transitions to running for evacuation.

For this reason, there is a power supply system for turning off the inter-system switch if the voltage of the first power supply or the second power supply becomes lower than a first threshold, and thereafter turns on the inter-system switch again if the voltage of the first power supply or the second power supply drops to a second threshold smaller than the first threshold within a predetermined time (see JP-A-2019-62727 for instance).

According to the power supply system, for example, even if the voltage of a power supply temporarily drops due to occurrence of an overload state, and the inter-system switch is turned off, after that, if the voltage of the power supply returns to the normal voltage, the inter-system switch is turned on again. Therefore, it is possible to minimize the automatic drive interruption time.

SUMMARY OF INVENTION

However, in the power supply system, since the second power supply is discharged from when the inter-system switch is turned off to when the inter-system switch is turned on again, the amount of charge in the second power supply when the inter-system switch is turned on again decreases.

An aspect of embodiments was provided in view of this circumstances, and an object thereof is to provide a power supply control device and a power supply control method capable of restraining the voltage of a second power supply from dropping when an inter-system switch is turned on again.

A power supply control device according to an aspect of embodiments includes: a first system configured to supply power of a first power supply to a first load; a second system configured to supply power of a second power supply to a second load; an inter-system switch configured to connect and disconnect the first system and the second system to and from each other; a battery switch configured to connect and disconnect the second power supply to and from the second system; and a controller configured to turn off the inter-system switch and turn on the battery switch in response to an abnormality of at least one of the first power supply or the second power supply being detected, and thereafter turn on the inter-system switch again and turn off the battery switch in response to determination that there is no abnormality in the first power supply or the second power supply. Before turning on the inter-system switch again, in a case where voltage difference between the first power supply and the second power supply is equal to or larger than a threshold, the controller performs convergence control such that the voltage difference becomes smaller than the threshold, and after determining that there is no abnormality in the first power supply or the second power supply, the controller keeps the battery switch turned off while performing the convergence control.

The power supply control device and the power supply control method according to the aspect of the embodiments have the effect of being able to restrain the amount of charge in the second power supply from decreasing when the inter-system switch is turned on again.

DESCRIPTION OF EMBODIMENTS

Hereinafter, an embodiment of a power supply control device and a power supply control method will be described in detail with reference to the accompanying drawings. However, the present invention is not limited by the following embodiments. Hereinafter, a power supply control device which is mounted on a vehicle having an automatic drive function in order to supply power to loads will be described as an example; however, the power supply control device according to the embodiment can also be mounted on a vehicle having no automatic drive function.

Hereinafter, the case where the vehicle on which the power supply control device is mounted is a hybrid automobile will be described. However, vehicles on which the power supply control device is mountable may be engine automobiles which run by internal combustion engines.

1. Configuration of Power Supply Control Device

Figure 1:
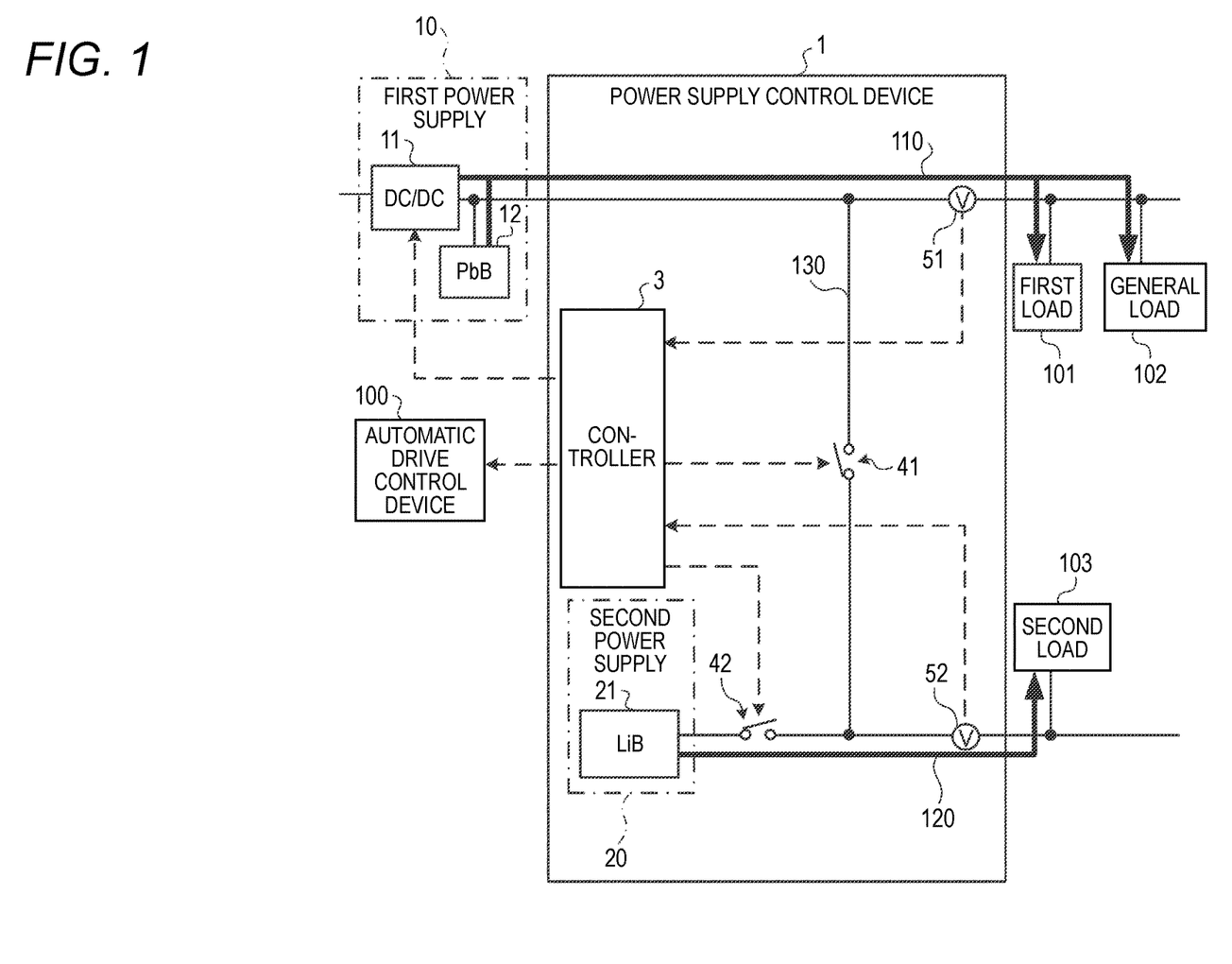
FIG. 1 is an explanatory view illustrating a configuration example of a power supply control device according to an embodiment.

FIG. 1 is an explanatory view illustrating a configuration example of a power supply control device according to an embodiment. As shown in FIG. 1, a power supply control device 1 according to the embodiment is connected to a first power supply 10, a first load 101, a general load 102, a second load 103, and an automatic drive control device 100. The power supply control device 1 includes a first system 110 for supplying power of the first power supply 10 to the first load 101 and the general load 102, and a second system 120 for supplying power of a second power supply 20 (to be described below) to the second load 103.

The first load 101 includes loads for automatic drive. For example, the first load 101 includes a steering motor, an electric brake device, onboard cameras, radars, and so on which operate during automatic drive. The general load 102 includes, for example, a display, an air conditioner, an audio system, a video system, various lights, and so on.

The second load 103 has the same function as the first load 101 has. The second load 103 includes devices which operate during automatic drive, such as a steering motor, an electric brake device, onboard cameras, and radars. The first load 101, the general load 102, and the second load 103 are operated by power supplied from the power supply control device 1. The automatic drive control device 100 is a device for performing automatic drive control on the vehicle by operating the first load 101 or the second load 103.

The first power supply 10 includes a DC-to-DC converter (hereinafter, referred to as the "DC/DC 11"), and a lead battery (hereinafter, referred to as the "PbB 12"). However, a battery for the first power supply 10 may be an arbitrary secondary battery other than the PbB 12.

The DC/DC 11 is connected to a power generator, and a high-voltage battery having a voltage higher than that of the PbB 12, and drops the voltages of the power generator and the high-voltage battery and outputs them to the first system 110. The power generator is, for example, an alternator for generating power by converting the kinetic energy of a running vehicle into electricity. The high-voltage battery is, for example, a vehicle driving battery which can be mounted on electric automobiles or hybrid automobiles.

By the way, in the case where the first power supply 10 is mounted on an engine automobile, an alternator (a power generator) can be provided instead of the DC/DC 11. The DC/DC 11 performs charging of the PbB 12, supply of power to the first load 101 and the general load 102, supply of power to the second load 103, and charging of the second power supply 20 (to be described below).

The power supply control device 1 includes the second power supply 20, an inter-system switch 41, a battery switch 42, a controller 3, a first voltage sensor 51, and a second voltage sensor 52. The second power supply 20 is a backup power supply for the case where supply of power by the first power supply 10 becomes impossible. The second power supply 20 includes a lithium-ion battery (hereinafter, referred to as the "LiB 21"). However, a battery for the second power supply 20 may be an arbitrary secondary battery other than the LiB 21.

The inter-system switch 41 is a switch provided on an inter-system line 130 for connecting the first system 110 and the second system 120 so as to be able to connect and disconnect the first system 110 and the second system 120 to and from each other. The battery switch 42 is a switch capable of connecting and disconnecting the second power supply 20 and the second system 120 to and from each other.

The first voltage sensor 51 is provided on the first system 110, and detects the voltage of the first system 110, and outputs the detection result to the controller 3. The second voltage sensor 52 is provided on the second system 120, and detects the voltage of the second system 120, and outputs the detection result to the controller 3.

The controller 3 includes a microcomputer having a central processing unit (CPU), a read only memory (ROM), a random access memory (RAM), and so on, and various circuits. However, the controller 3 may be configured with hardware such as application specific integrated circuit (ASIC) and a field programmable gate array (FPGA).

The CPU executes programs stored in the ROM, using the RAM as a work area, whereby the controller 3 controls the operation of the power supply control device 1. The controller 3 detects a ground fault of the first system 110 or the second system 120 on the basis of the detection results input from the first voltage sensor 51 and the second voltage sensor 52. Specific examples of a ground fault detecting method using the controller 3 will be described below.

If a ground fault of the first system 110 or the second system 120 is detected, the controller 3 notifies it to the automatic drive control device 100. However, if a ground fault of the first system 110 or the second system 120 is detected, the controller 3 may notify the automatic drive control device 100 that automatic drive is impossible. Also, when any ground fault of the first system 110 or the second system 120 is not detected, the controller 3 may notify the automatic drive control device 100 that automatic drive is possible.

If a power supply fault such as a ground fault occurs in the first system 110, the controller 3 turns off the inter-system switch 41, and turns on the battery switch 42 to provide power from the second power supply 20 to the second load 103. Also, if a power supply fault such as a ground fault occurs in the second system 120, the controller 3 turns off the inter-system switch 41, and turns off the battery switch 42, thereby supplying power from the first power supply 10 to the first load 101 and the general load 102.

Therefore, even if a ground fault occurs in any one system during automatic drive, the power supply control device 1 uses the other system to make it possible for the automatic drive control device 100 to drive the vehicle to a safe place for evacuation and stop the vehicle. Now, the operation of the power supply control device 1 will be described with reference to FIG. 2 to FIG. 8.

2. Normal Operation of Power Supply Control Device

Figure 2:
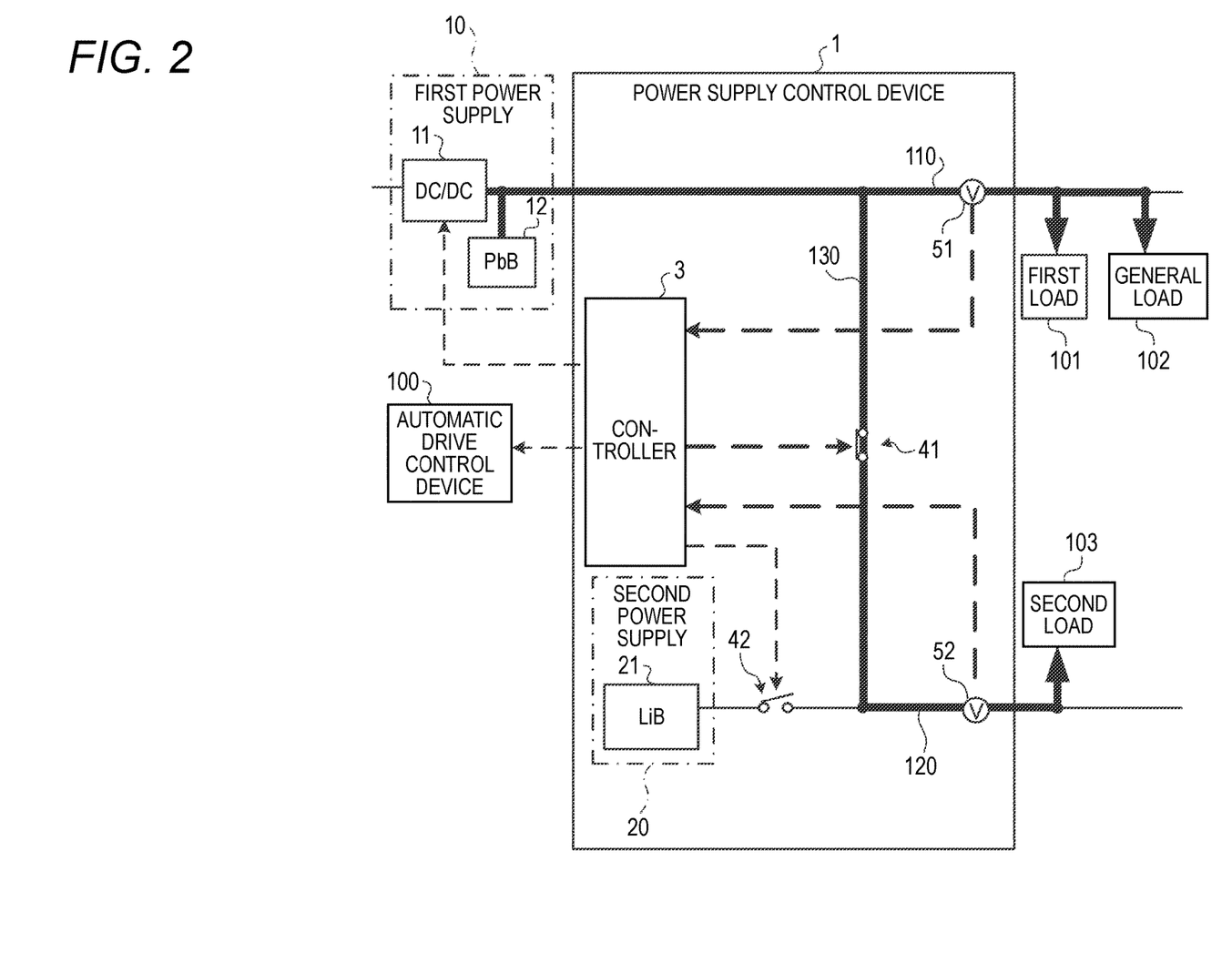
FIG. 2 is an explanatory view illustrating an operation example of the power supply control device according to the embodiment.

In normal times when there is no ground fault in the first system 110 and the second system 120, the controller 3 keeps the inter-system switch 41 in the conductive state while keeping the battery switch 42 turned off, as shown in FIG. 2, to supply power from the first power supply 10 to the first load 101, the general load 102, and the second load 103.

3. Operation of Power Supply Control Device

Figure 3:
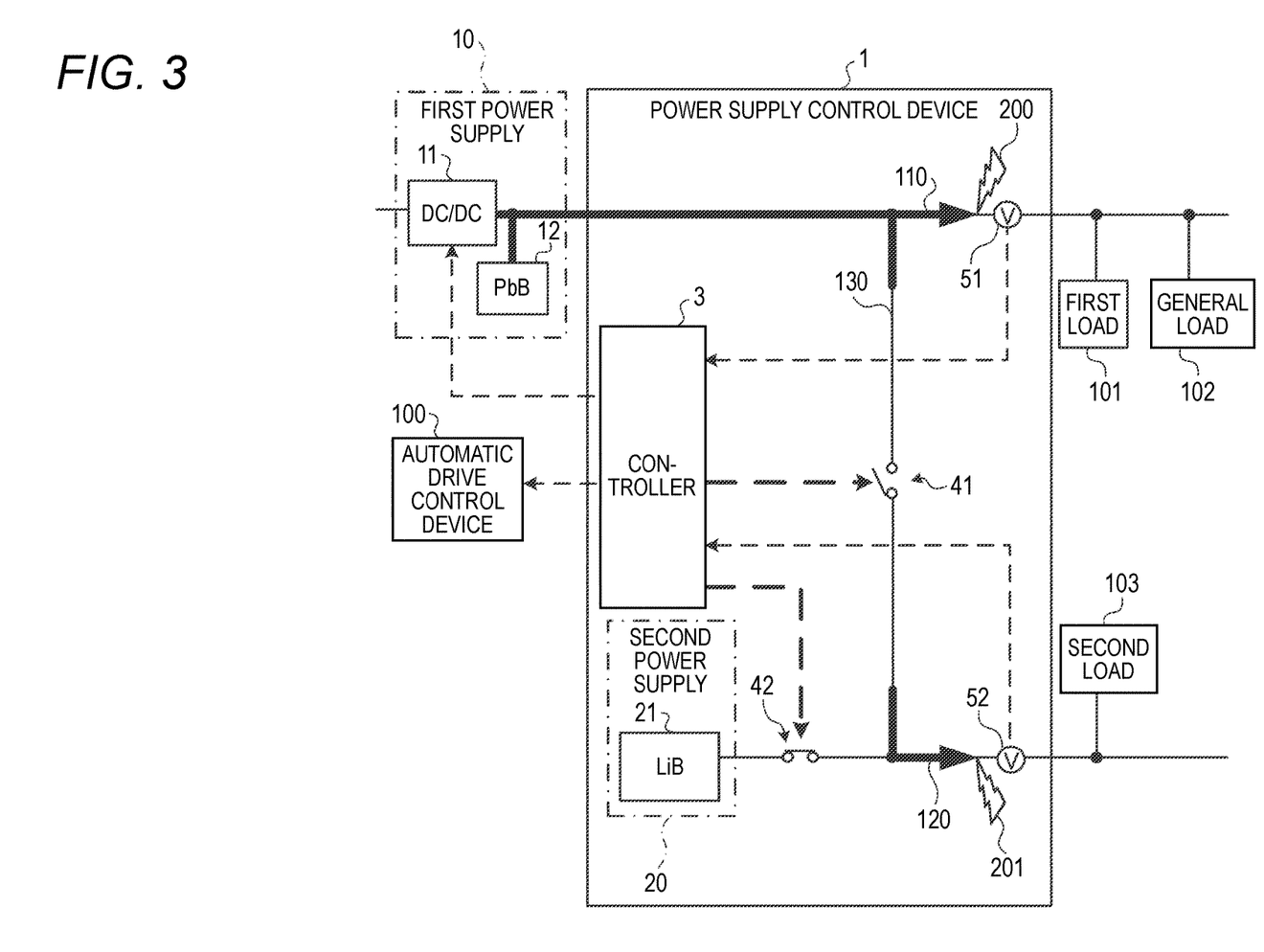
FIG. 3 is an explanatory view illustrating another operation example of the power supply control device according to the embodiment.

Now, the operation of the power supply control device 1 will be described with reference to FIG. 3 to FIG. 8. FIG. 3 to FIG. 8 are explanatory views illustrating operation examples of the power supply control device according to the embodiment. As shown in FIG. 3, in the power supply control device 1, for example, in a case where a ground fault 200 occurs in the first system 110, since an overcurrent flows to the ground fault point, the voltage of the first system 110 which is detected by the first voltage sensor 51 becomes equal to or lower than a ground fault threshold.

Also, in the power supply control device 1, in a case where a ground fault 201 occurs in the second system 120, since an overcurrent flows to the ground fault point, the voltage of the second system 120 which is detected by the second voltage sensor 52 becomes equal to or lower than the ground fault threshold.

Therefore, if at least one of the voltages which are detected by the first voltage sensor 51 and the second voltage sensor 52 becomes equal to or lower than the ground fault threshold, the controller 3 detects a power supply abnormality, and turns off the inter-system switch 41, and turns on the battery switch 42. At this time, the controller 3 tentatively determines that any ground fault has occurred in the first system 110 or the second system 120.

Thereafter, if the voltage which is detected by the first voltage sensor 51 is equal to or lower than the ground fault threshold for over a predetermined time, and the voltage which is detected by the second voltage sensor 52 returns to the voltage higher than the ground fault threshold within the predetermined time, the controller 3 definitely determines that a ground fault 200 has occurred in the first system 110.

Figure 4:
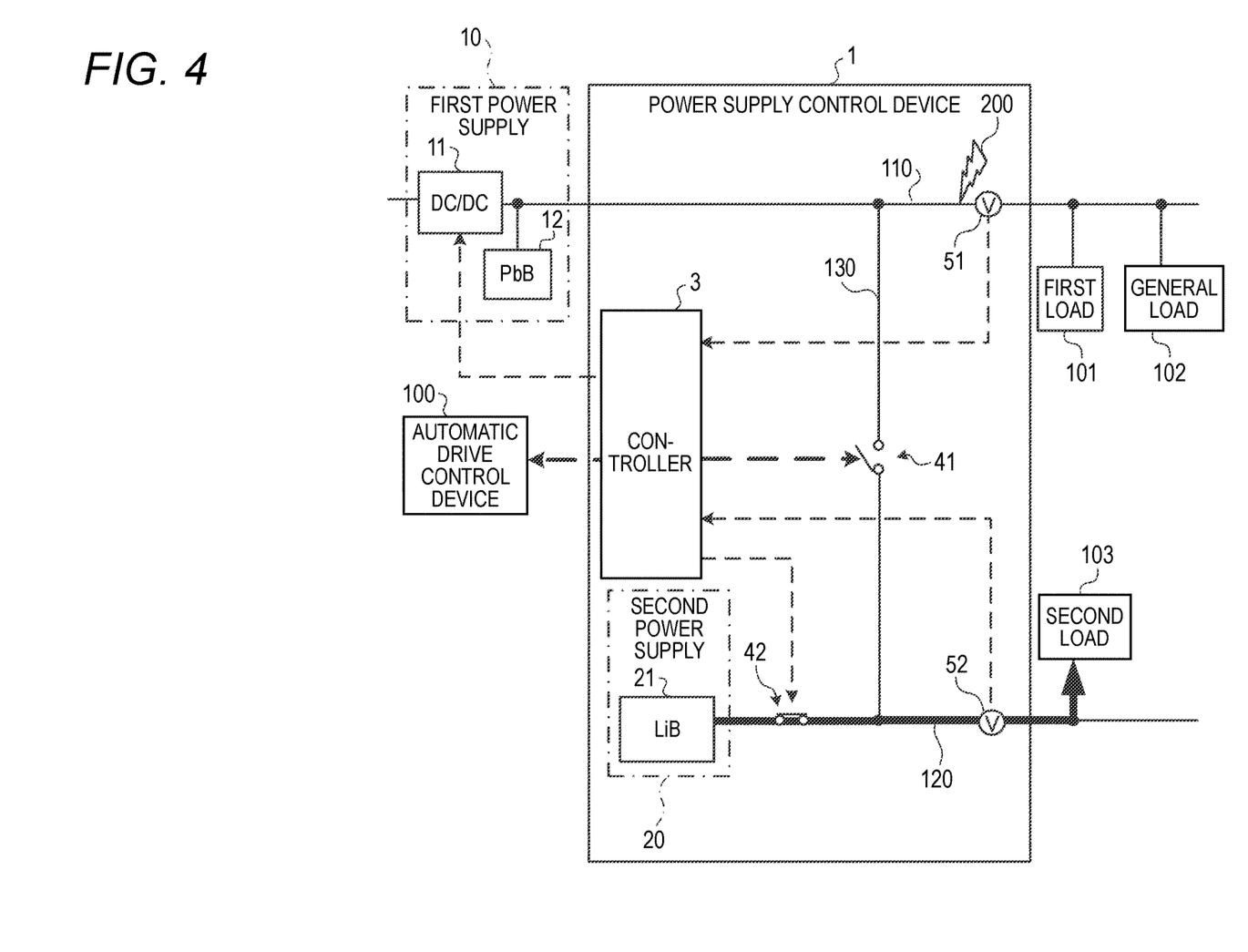
FIG. 4 is an explanatory view illustrating another operation example of the power supply control device according to the embodiment.

Then, the controller 3 supplies power from the second power supply 20 to the second load 103, as shown in FIG. 4, and notifies it to the automatic drive control device 100. As a result, the automatic drive control device 100 operates the second load 103 by the power which is supplied from the second power supply 20, thereby capable of making the vehicle run to a safe place for evacuation and stop there.

Further, after tentatively determining that any ground fault has occurred in the first system 110 or the second system 120, if the voltage which is detected by the second voltage sensor 52 is equal to or lower than the ground fault threshold for over the predetermined time, and the voltage which is detected by the first voltage sensor 51 returns to the voltage higher than the ground fault threshold within the predetermined time, the controller 3 definitely determines that a ground fault 201 has occurred in the second system 120.

Figure 5:
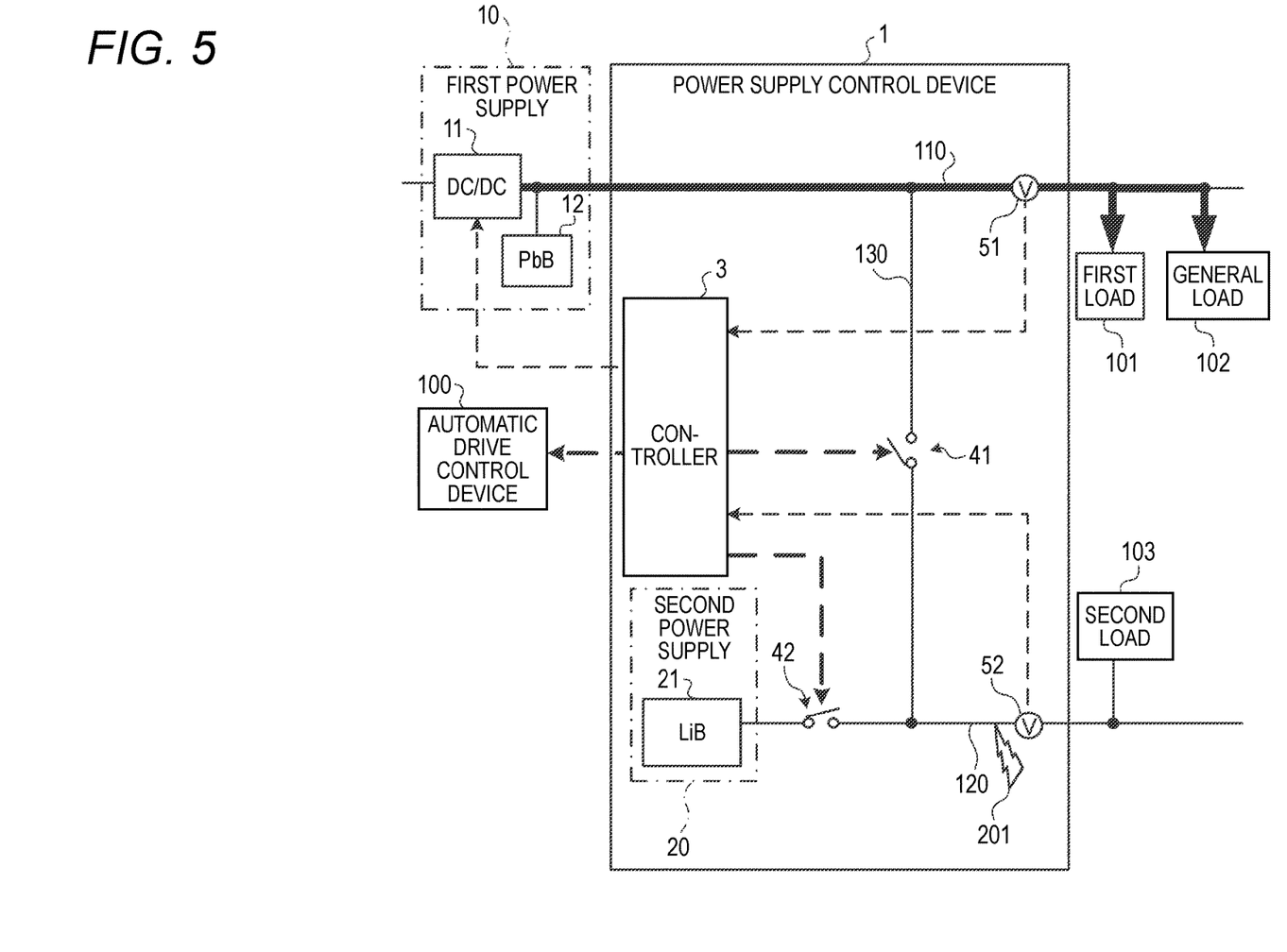
FIG. 5 is an explanatory view illustrating another operation example of the power supply control device according to the embodiment.

Then, the controller 3 turns off the battery switch 42 to supply power from the first power supply 10 to the first load 101, as shown in FIG. 5, and notifies it to the automatic drive control device 100. As a result, the automatic drive control device 100 operates the first load 101 by the power which is supplied from the first power supply 10, thereby capable of making the vehicle run to a safe place for evacuation and stop there.

Furthermore, in the power supply control device 1, in a case where there is no ground fault 200 or 201, and the first load 101 or the general load 102 goes into an overload state, the voltage which is detected by the first voltage sensor 51 may become equal to or lower than the ground fault threshold temporally. Also, in the power supply control device 1, if the second load 103 goes into an overload state, the voltage which is detected by the second voltage sensor 52 may become equal to or lower than the ground fault threshold temporally.

Figure 6:
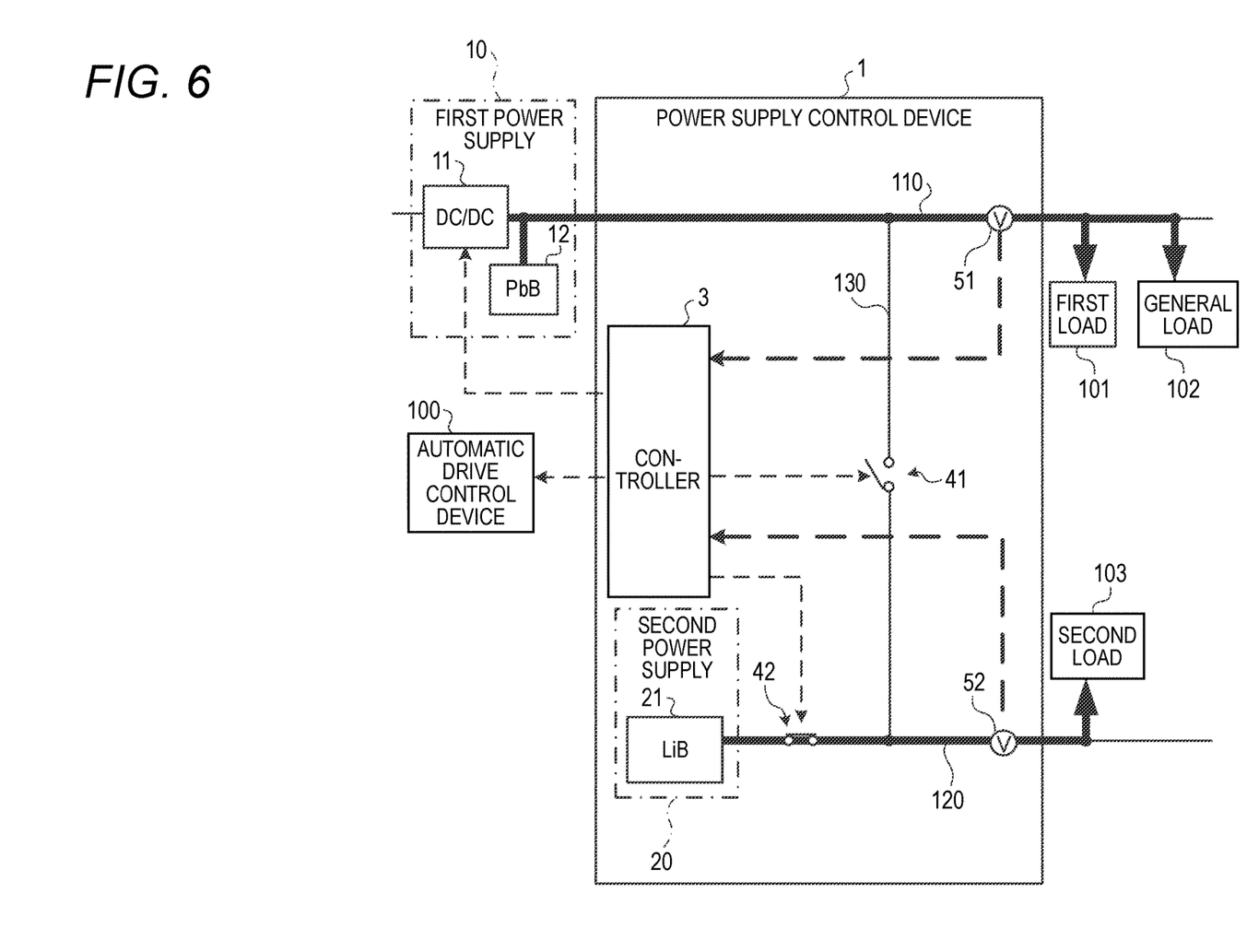
FIG. 6 is an explanatory view illustrating another operation example of the power supply control device according to the embodiment.

In this case, as shown in FIG. 6, continuously, the power supply control device 1 supplies power from the first power supply 10 to the first load 101 and the general load 102, and supplies power from the second power supply 20 to the second load 103.

For this reason, after tentatively determining that any ground fault of the first system 110 or the second system 120 has occurred, if both of the voltages that are defined by the first voltage sensor 51 and the second voltage sensor 52 return to the voltages higher than the ground fault threshold within the predetermined time, the controller 3 definitely determines that there is no abnormality in the power supplies. Thereafter, the controller 3 turns off the battery switch 42 and turns on the inter-system switch 41 again, to return to the normal operation shown in FIG. 2.

At this time, in the power supply control device 1, since power had been supplied from the second power supply 20 to the second load 103 from when the inter-system switch 41 was turned off to when it was definitely determined that there was any abnormality in the power supplies, the voltage of the second power supply 20 may be lower than the voltage of the first power supply 10. Further, depending on the operation states of the first load 101, the general load 102, and the second load 103, the voltage of the first power supply 10 may be lower than the voltage of the second power supply 20.

In the power supply control device 1, if the inter-system switch is turned on again when the potential difference between the first power supply 10 and the second power supply 20 is large, the inter-system switch 41 may be damaged. For this reason, before turning on the inter-system switch 41 again, in a case where the potential difference between the first power supply 10 and the second power supply 20 is equal to or larger than a predetermined threshold, the controller 3 performs convergence control such that the potential difference becomes smaller than the threshold.

Figure 7:
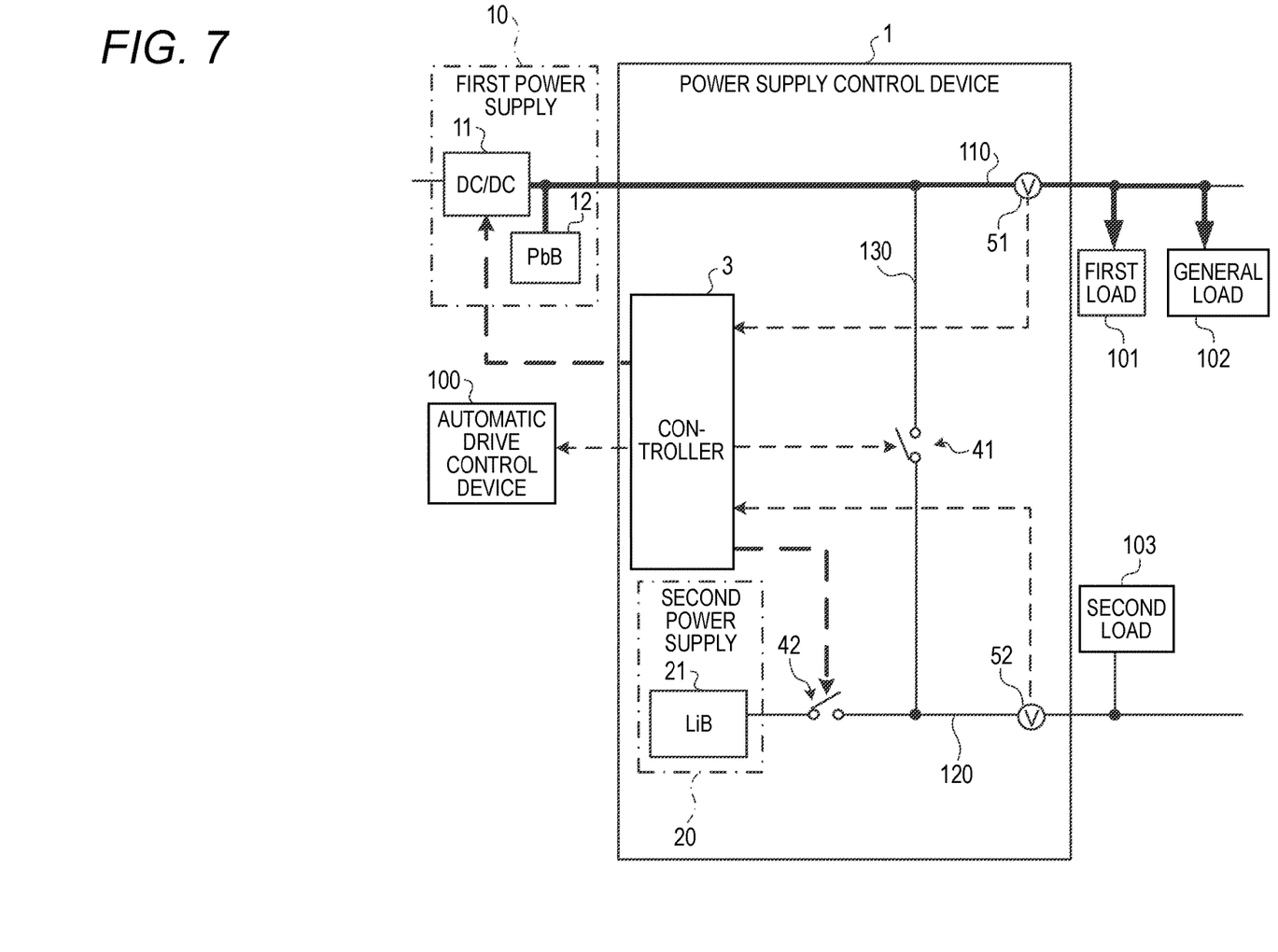
FIG. 7 is an explanatory view illustrating another operation example of the power supply control device according to the embodiment.

However, during convergence control, in a case where the power supply control device 1 keeps the battery switch 42 in the conductive state, the second power supply 20 is discharged, whereby the amount of charge in the LiB 21 decreases. For this reason, if definitely determining that there is no abnormality in the power supplies, the controller 3 stores the voltage of the second power supply 20, and then turns off the battery switch 42 as shown in FIG. 7.

Thereafter, when the potential difference between the first power supply 10 and the second power supply 20 is equal to or larger than the predetermined threshold, the controller 3 performs convergence control such that the potential difference becomes smaller than the threshold. For example, in a case where the voltage of the second power supply 20 immediately before turning off the battery switch 42 is lower than the voltage of the first power supply 10, the controller 3 outputs a command to the DC/DC 11 to lower the voltage of the first power supply 10, thereby performing convergence control.

However, when the voltage of the second power supply 20 immediately before turning off the battery switch 42 is lower than the voltage of the PbB 12, for example, the controller 3 may perform convergence control by requesting a higher-level control device (not shown in the drawings) to operate the general load 102 such that the power of the PbB 12 is forcibly consumed.

Further, when the voltage of the first power supply 10 is lower than the voltage of the second power supply 20 immediately before turning off the battery switch 42, the controller 3 performs convergence control by outputting a command to the DC/DC 11 to raise the voltage of the first power supply 10.

As described above, if determining that there is no abnormality in the power supplies, the controller 3 turns off the battery switch 42 immediately. Therefore, when the voltage of the second power supply 20 is lower than the voltage of the first power supply 10, it is possible to suppress a drop in the voltage of the second power supply 20 to the minimum. Therefore, the controller 3 can minimize the voltage difference between the first power supply 10 and the second power supply 20. As a result, it is possible to reduce the time required for convergence control.

Further, after determining that there is no abnormality in the power supplies, the controller 3 keeps the battery switch 42 turned off while performing convergence control. Therefore, it is possible to suppress a decrease in the amount of charge in the second power supply 20 when the inter-system switch 41 is turned on again.

Figure 8:
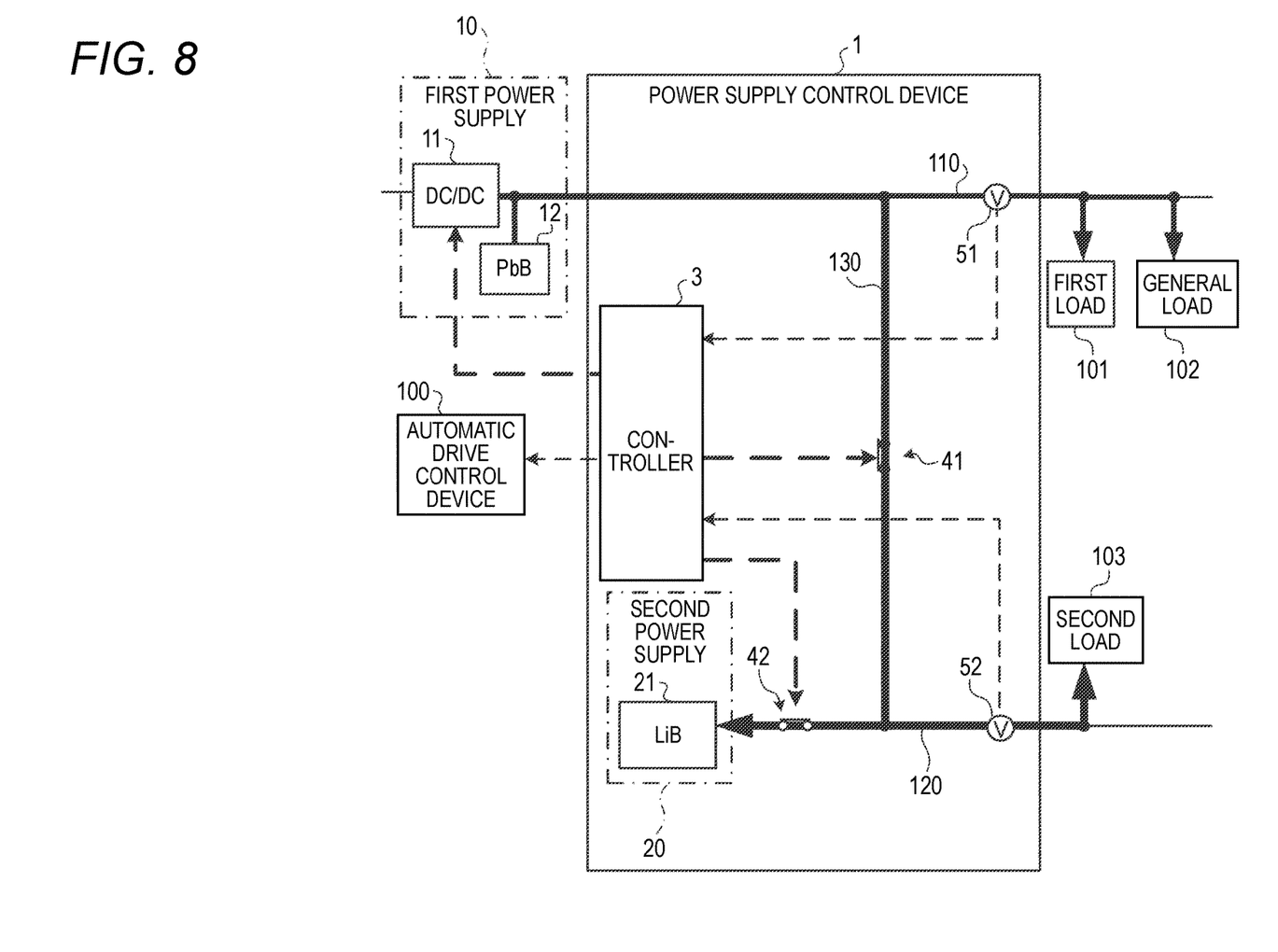
FIG. 8 is an explanatory view illustrating another operation example of the power supply control device according to the embodiment.

Thereafter, when the convergence control is completed, the controller 3 turns on the battery switch 42 again, and then turns on the inter-system switch 41 again, as shown in FIG. 8, such that the second power supply 20 is charged with the power of the first power supply 10. Alternatively, the controller 3 may turn on the battery switch 42 and the inter-system switch 41 again at the same time.

At this time, since the power supply control device 1 keeps the potential difference between the first power supply 10 and the second power supply 20 below the predetermined threshold by convergence control, even if the inter-system switch 41 is turned on again, the inter-system switch 41 is not damaged.

Thereafter, when the charging of the second power supply 20 is completed, the controller 3 turns off the battery switch 42. As a result, after returning to the normal operation, the power supply control device 1 can prevent the second power supply 20 from being discharged unnecessarily. Further, since automatic drive is not allowed unless the second power supply 20 is charged to a voltage required for backup control, discharging of the second power supply 20 is suppressed. Therefore, the opportunities for automatic drive increase.

Thereafter, in a case where a power supply fault such as a ground fault occurs in the first system 110, the power supply control device 1 may start backup control with the fully charged second power supply 20. Therefore, it is possible to extend the evacuation travel distance.

Figure 9:
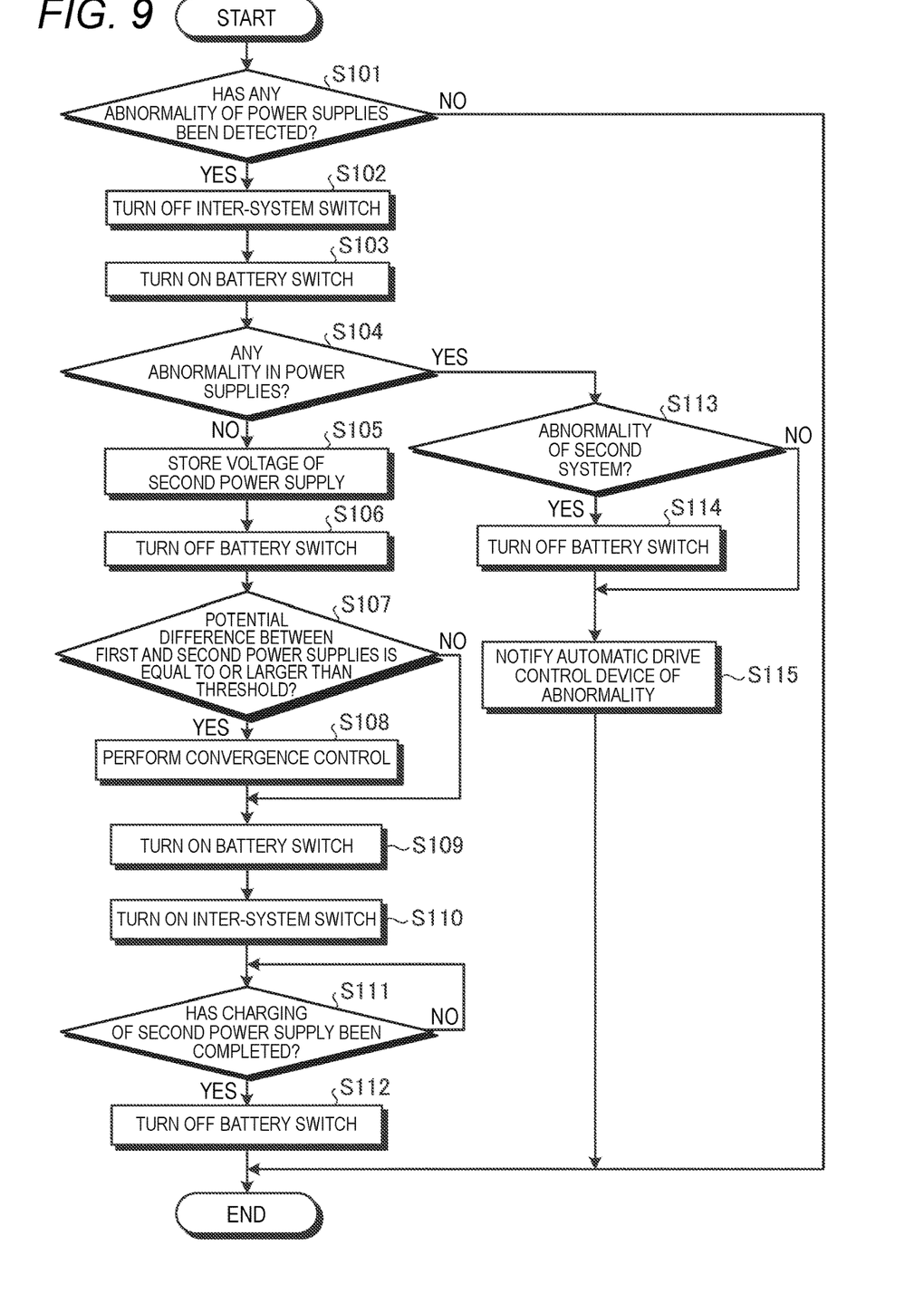
FIG. 9 is a flow chart illustrating an example of processing which is performed by a controller of the power supply control device according to the embodiment.

4. Processing which is Performed by Controller of Power Supply Control Device Now, an example of processing which is performed by the controller according to the embodiment will be described with reference to FIG. 9. FIG. 9 is a flow chart illustrating the example of processing which is performed by the controller of the power supply control device according to the embodiment. The controller 3 according to the embodiment repeatedly performs the processing shown in FIG. 9 during the normal operation.

Specifically, as shown in FIG. 9, first, the controller 3 determines whether any abnormality of the power supplies has been detected (STEP S101). If determining that any abnormality of the power supplies has not been detected ("No" in STEP S101), the controller 3 ends the processing, and restarts the processing from STEP S101.

Meanwhile, if determining (tentatively determining) that any abnormality of the power supplies has been detected ("Yes" in STEP S101), the controller 3 turns off the inter-system switch 41 (STEP S102), and turns on the battery switch 42 (STEP S103). Subsequently, the controller 3 determines (definitely determines) whether there is any abnormality in the power supplies (STEP S104).

If determining that there is any abnormality in the power supplies ("Yes" in STEP S104), the controller 3 determines whether the abnormality is an abnormality of the second system 120 (STEP S113). If determining that the abnormality is an abnormality of the second system 120 ("Yes" in STEP S113), the controller 3 turns off the battery switch 42 (STEP S114), notifies the automatic drive control device 100 (STEP S115) of it, ends the processing, and restarts the processing from STEP S101. As a result, evacuation travel control is performed using the first system 110.

Meanwhile, if determining that the abnormality is not an abnormality of the second system 120 ("No" in STEP S113), since it is an abnormality of the first system 110, the controller 3 notifies the automatic drive control device 100 of it (STEP S115), ends the processing, and restarts the processing from STEP S101. As a result, evacuation travel control is performed using the second system 120.

Meanwhile, if determining that there is no abnormality in the power supplies ("No" in STEP S104), the controller 3 stores the voltage of the second power supply 20 (STEP S105), and turns off the battery switch 42 (STEP S106). Subsequently, the controller 3 determines whether the voltage difference between the first power supply 10 and the second power supply 20 is equal to or larger than a threshold, or not (STEP S107).

If determining that the voltage difference between the first power supply 10 and the second power supply 20 is smaller than the threshold ("No" in STEP S107), the controller 3 advances the processing to STEP S109. Meanwhile, if determining that the voltage difference between the first power supply 10 and the second power supply 20 is equal to or larger than the threshold ("Yes" in STEP S107), the controller 3 performs convergence control until the corresponding voltage difference becomes smaller than the threshold (STEP S108).

Thereafter, the controller 3 turns on the battery switch 42 (STEP S109), and turns on the inter-system switch 41 (STEP S110). Subsequently, the controller 3 determines whether charging of the second power supply 20 has been completed (STEP S111).

If determining that charging of the second power supply 20 has not been completed ("No" in STEP S111), the controller 13 repeats the determining process of STEP S111 until charging of the second power supply 20 is completed. Then, if determining that charging of the second power supply 20 has been completed ("Yes" in STEP S111), the controller 3 turns off the battery switch 42 (STEP S112), ends the processing, and restarts the processing from STEP S101.

Various advantages and modifications can be easily achieved by those skilled in the art. Therefore, the invention in its broader aspects is not limited to the specific details and representative embodiments shown and described above. Accordingly, various modifications may be made without departing from the spirit or scope of the general inventive concept as defined by the appended claims and their equivalents.

What is claimed is:

1. A power supply control device comprising:
a first system configured to supply power of a first power supply to a first load;
a second system configured to supply power of a second power supply to a second load;
an inter-system switch configured to connect and disconnect the first system and the second system to and from each other;
a battery switch configured to connect and disconnect the second power supply to and from the second system; and
a controller configured to turn off the inter-system switch and turn on the battery switch in response to an abnormality of at least one of the first power supply or the second power supply being detected, and thereafter turn on the inter-system switch again and turn off the battery switch in response to determination that there is no abnormality in the first power supply or the second power supply,
wherein, before turning on the inter-system switch again, in a case where voltage difference between the first power supply and the second power supply is equal to or larger than a threshold, the controller performs convergence control such that the voltage difference becomes smaller than the threshold, and after determining that there is no abnormality in the first power supply or the second power supply, the controller keeps the battery switch turned off while performing the convergence control.

2. The power supply control device according to claim 1, wherein,
when the convergence control is completed, the controller turns on the inter-system switch and the battery switch to perform charging of the second power supply, and when the charging of the second power supply is completed, the controller turns off the battery switch.

3. The power supply control device according to claim 1, wherein, the first power supply includes a DC-to-DC converter, and
the controller performs the convergence control by outputting a command to the DC-to-DC converter to lower a voltage of the first power supply in a case where a voltage of the second power supply is lower than the voltage of the first power supply.

4. The power supply control device according to claim 1, wherein,
the first power supply includes a DC-to-DC converter, and
the controller performs the convergence control by outputting a command to the DC-to-DC converter to raise a voltage of the first power supply in a case where the voltage of the first power supply is lower than a voltage of the second power supply.

5. The power supply control device according to claim 1, wherein,
the first power supply includes a lead battery, and
the controller performs the convergence control by performing control to operate a general load such that power of the lead battery is consumed in a case where a voltage of the second power supply is lower than the voltage of a lead power supply.

6. A power supply control method of a power supply control device including a first system configured to supply power of a first power supply to a first load, a second system configured to supply power of a second power supply to a second load, an inter-system switch configured to connect and disconnect the first system and the second system to and from each other, and a battery switch configured to connect and disconnect the second power supply to and from the second system, the power supply control method comprising:
turning off the inter-system switch and turning on the battery switch in response to an abnormality of at least one of the first power supply or the second power supply being detected, and thereafter turning on the inter-system switch again and turning off the battery switch in response to determination that there is no abnormality in the first power supply or the second power supply; and
performing convergence control such that the voltage difference between the first power supply and the second power supply becomes smaller than the threshold, in a case where voltage difference is equal to or larger than a threshold, before turning on the inter-system switch again, and keeping the battery switch turned off while performing the convergence control, after determining that there is no abnormality in the first power supply or the second power supply.

7. A power supply control device comprising:
a first system configured to supply power of a first power supply to a first load;
a second system configured to supply power of a second power supply to a second load;
an inter-system switch configured to connect and disconnect the first system and the second system to and from each other;
a battery switch configured to connect and disconnect the second power supply to and from the second system; and
a controller configured to turn off the inter-system switch in response to an abnormality of at least one of the first power supply or the second power supply being detected, turn on the battery switch, determine which system the abnormality is detected in, turn off the battery switch in response to determination that there is no abnormality in the first power supply or the second power supply, and, in a case where voltage difference between the first power supply and the second power supply is equal to or larger than a threshold, perform convergence control such that the voltage difference becomes smaller than the threshold, turn on the inter-system switch again, and turn off the battery switch.

8. The power supply control device according to claim 7, wherein, when the convergence control is completed, the controller turns on the inter-system switch and the battery switch to perform charging of the second power supply, and when the charging of the second power supply is completed, the controller turns off the battery switch.

9. The power supply control device according to claim 7, wherein,
the first power supply includes a DC-to-DC converter, and
the controller performs the convergence control by outputting a command to the DC-to-DC converter to lower a voltage of the first power supply in a case where a voltage of the second power supply is lower than the voltage of the first power supply.

10. The power supply control device according to claim 7, wherein,
the first power supply includes a DC-to-DC converter, and
the controller performs the convergence control by outputting a command to the DC-to-DC converter to raise a voltage of the first power supply in a case where the voltage of the first power supply is lower than the voltage of the second power supply.

11. The power supply control device according to claim 7, wherein,
the first power supply includes a lead battery, and
the controller performs the convergence control by performing control to operate a general load such that power of the lead battery is consumed in a case where a voltage of the second power supply is lower than the voltage of a lead power supply.

\* \* \* \* \*